No. 776,814. Patented November 29, 1904.

UNITED STATES PATENT OFFICE.

ADOLPH FRANK, OF CHARLOTTENBURG, GERMANY.

PROCESS OF MAKING AMMONIA.

SPECIFICATION forming part of Letters Patent No. 776,814, dated November 29, 1904.

Application filed June 20, 1901. Serial No. 65,344. (No specimens.)

*To all whom it may concern:*

Be it known that I, ADOLPH FRANK, a subject of the German Emperor, and a resident of Charlottenburg, Germany, have invented certain new and useful Improvements in and Relating to the Manufacture of Ammonia; and I do hereby declare the following to be a full, clear, and exact description of the invention, such as will enable others skilled in the art to which it appertains to make and use the same.

My invention has relation to the manufacture of ammonia; and it consists in a novel process whereby the whole or substantially the whole of the nitrogen in the chemical can be converted into ammonia, and I have discovered that this result is obtained, broadly speaking, by reacting upon the cyanamid with water, either as such (free or in a combined state) or in the form of vapor or steam, of a suitable temperature and in the proportion of not less than three molecules (fifty-four parts, by weight) of water to two atoms (twenty-eight parts, by weight) of the nitrogen present in the cyanamid.

Instead of cyanamid I may employ any one of its salts—as, for instance, calcium cyanamid ($CaCN_2$)—in which case I can also obtain the corresponding metal present in the salt in the form of a carbonate.

As is well known, chemically-pure cyanamid is very costly, and for practical purposes I use either the commercial article, though more or less impure, or a salt of cyanamid with equally good results, and inasmuch as the commercial cyanamid, as well as its salts, can be obtained by the action of the nitrogen present in the atmosphere on a carbid or carbidic material in presence of heat until absorption of the nitrogen ceases I am enabled to obtain ammonia from the nitrogen of the air.

In carrying out my invention I subject the cyanamid to the action of an aqueous fluid—water or vapor or steam—at a temperature not less than 100° centigrade and in a proportion of not less than three molecules (fifty-four parts, by weight) of water to two atoms (twenty-eight parts, by weight) of nitrogen present in the cyanamid for a sufficient length of time to convert the nitrogen into ammonia, the period depending upon the purity of the cyanamid and the temperature at which the reaction is effected.

The ammonia is collected and made use of for any desired purpose either as such or in a liquefied state or in an absorbed condition in the form of aqua ammonia, for instance, or the ammonia may be absorbed by an acid and obtained in the form of an ammoniacal salt. On the other hand, if the reaction is carried on in the presence of carbonic acid the ammonia is obtained in the form of ammonium carbonate or carbamid.

When a cyanamid salt is employed, I obtain the metal in the form of a carbonate. For instance, if calcium cyanamid is employed the reaction will be in accordance with the following equation:

$$CaCN_2 + 3H_2O = CaCO_3 + 2NH_3.$$

I have furthermore discovered that if cyanamid or salt thereof is boiled in water for a sufficiently long period formiates of the metal present in the chemical are obtained in solution, while formiates of the metals present in the carbid used in the production of cyanamid are formed by the action of steam of a temperature of about 300° centigrade, which formiates are recoverable from the residues. I have furthermore discovered that the reaction will be considerably expedited if effected under pressure—for instance, under a pressure corresponding with the temperature at which the reaction is effected, which pressure is readily obtained by effecting the reaction in a closed vessel.

Under the term of "cyanamid" I include all of its salts, and under "aqueous fluid" I mean water, vapor, or steam.

By the described process and as hereinbefore stated I am enabled to convert the whole or substantially the whole of the nitrogen in the cyanamid into ammonia.

In the practice of my process under pressure with calcium cyanamid, for instance, the latter is heated for about two hours in a suitable closed vessel in the presence of an aqueous fluid in the proportions hereinabove stated to a temperature of from about 160° to 180° centigrade, at which temperature the corresponding pressure will be about ten atmospheres, the said vessel being provided with a safety-valve and with a valved pipe for the eduction of the ammonia formed by the reaction. Within the period above mentioned all or substantially all the nitrogen present in the cyanamid will be converted into ammonia, which may be collected or caused to be absorbed by water or by an acid in a well-known manner and for purposes hereinabove stated. The reaction will be somewhat expedited under the action of steam under a pressure of from six to ten atmospheres.

Having thus described my invention, what I claim as new therein, and desire to secure by Letters Patent, is—

1. The process of obtaining ammonia, which consists in reacting upon cyanamid with aqueous fluid in the proportion of not less than three molecules of water to two atoms of the nitrogen present in the cyanamid at a temperature above 100° centigrade substantially as set forth.

2. The process of obtaining ammonia, which consists in reacting upon cyanamid with aqueous fluid in the proportion of not less than three molecules of water to two atoms of the nitrogen present in the cyanamid, at a temperature of not less than 100° centigrade, and in presence of carbonic-acid gas, substantially as and for the purpose set forth.

3. The process of obtaining ammonia, which consists in reacting upon cyanamid with aqueous fluid in the proportion of not less than three molecules of water to two atoms of the nitrogen present in the cyanamid at a temperature not less than 100° centigrade, and effecting the reaction under pressure, substantially as and for the purposes set forth.

4. The process of obtaining ammonia, which consists in reacting upon cyanamid with aqueous fluid in the proportion of not less than three molecules of water to two atoms of the nitrogen present in the cyanamid at a temperature of not less than 100° centigrade, and in presence of carbonic-acid gas and effecting the reaction under pressure, substantially as and for the purpose set forth.

5. The process of obtaining ammonia, which consists in boiling cyanamid with aqueous fluid in the proportion of not less than three molecules of water to two atoms of the nitrogen present in the cyanamid, whereby formiates re obtained in solution, substantially as and for the purposes set forth.

6. The process of obtaining ammonia, which consists in reacting upon cyanamid with steam in the proportion of not less than three molecules of water to two atoms of nitrogen present in the cyanamid, at a temperature of about 300° centigrade, whereby formiates of the metals bound in the carbid used in the production of the cyanamid are also obtained, substantially as set forth.

In testimony that I claim the foregoing as my invention I have signed my name in presence of two subscribing witnesses.

ADOLPH FRANK.

Witnesses:
JOHANNES HEIN,
HENRY HASPER.